April 6, 1965     R. L. KNIGHT     3,177,006
AXLE CONTROL ARM FOR VEHICLE SUSPENSION Filed Jan. 7, 1964     2 Sheets-Sheet 1

INVENTOR.
Richard L. Knight
BY
W. F. Wegner
ATTORNEY

April 6, 1965 R. L. KNIGHT 3,177,006
AXLE CONTROL ARM FOR VEHICLE SUSPENSION
Filed Jan. 7, 1964 2 Sheets-Sheet 2

INVENTOR.
Richard L. Knight
BY
W. F. Wagner
ATTORNEY

United States Patent Office 3,177,006
Patented Apr. 6, 1965

3,177,006
AXLE CONTROL ARM FOR VEHICLE
SUSPENSION
Richard L. Knight, Mentor, Ohio, assignor to General
Motors Corporation, Detroit, Mich., a corporation of
Delaware
Filed Jan. 7, 1964, Ser. No. 336,170
7 Claims. (Cl. 280—124)

This invention relates to a vehicle suspension system in general and more particularly to a suspension system for heavy duty off-highway trucks.

One object of this invention is to provide an improved suspension system for an off-highway truck. Another object of this invention is to provide a vehicle suspension system having a simple and inexpensive construction which maintains the axle stable with respect to the vehicle chassis in the vertical, longitudinal, and lateral directions and, in addition, provide for torsional resistance to braking and tractive efforts of the wheels.

The above and other objects are accomplished in accordance with the invention by a suspension system that comprises a pair of A-shaped control arms each of which is universally pivotally connected at the vertex thereof to the vehicle chassis. The opposite end of each control arm is formed with a pair of spaced legs or extensions that are pivotally connected to the wheel axle at points laterally spaced from each other and located above and below the axis of wheel rotation so that longitudinal planes passing through the axle pivot connections of each control arm will intersect at a point vertically spaced from the axis of wheel rotation and midway between the ends of the axle. In addition, spring means are provided between the axle and frame for resiliently supporting the chassis and cushioning oscillatory movement of the axle.

A more complete understanding of the invention may be derived from the following detailed description when taken in conjunction with the drawings in which.

Figure 1:
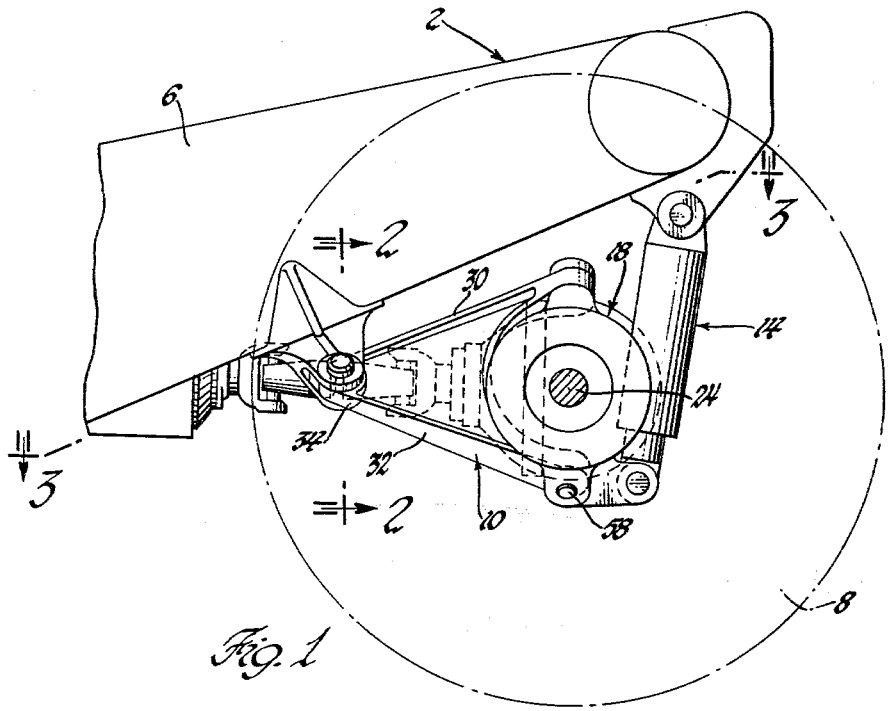
FIGURE 1 is a fragmentary view illustrating the rear end of an off-highway vehicle equipped with a suspension system made in accordance with the invention.
Figure 2:
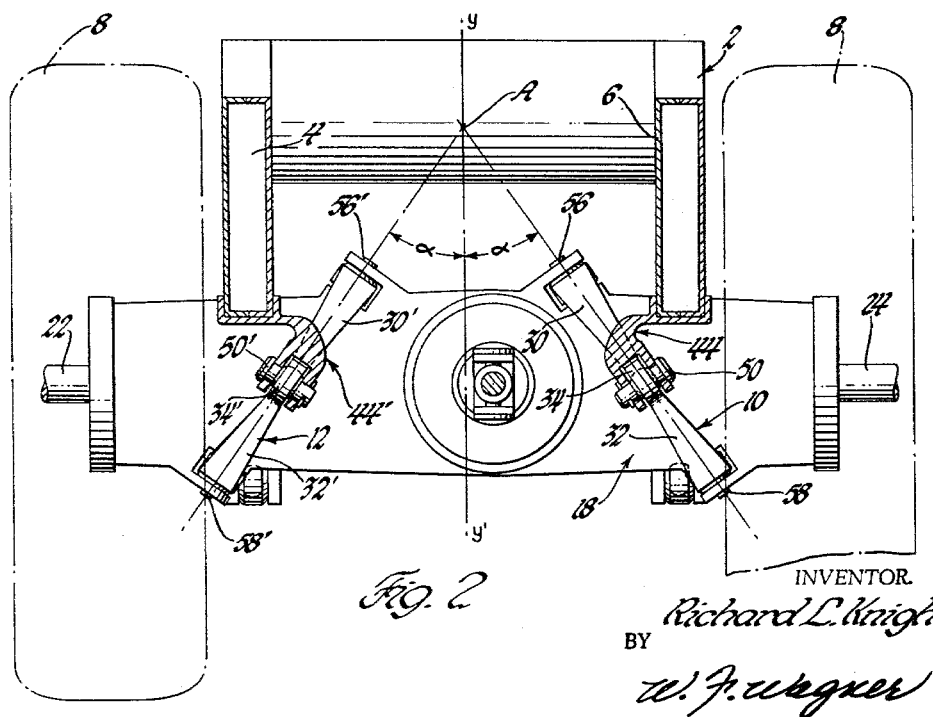
FIGURE 2 is a view taken on line 2—2 of FIGURE 1.
Figure 3:
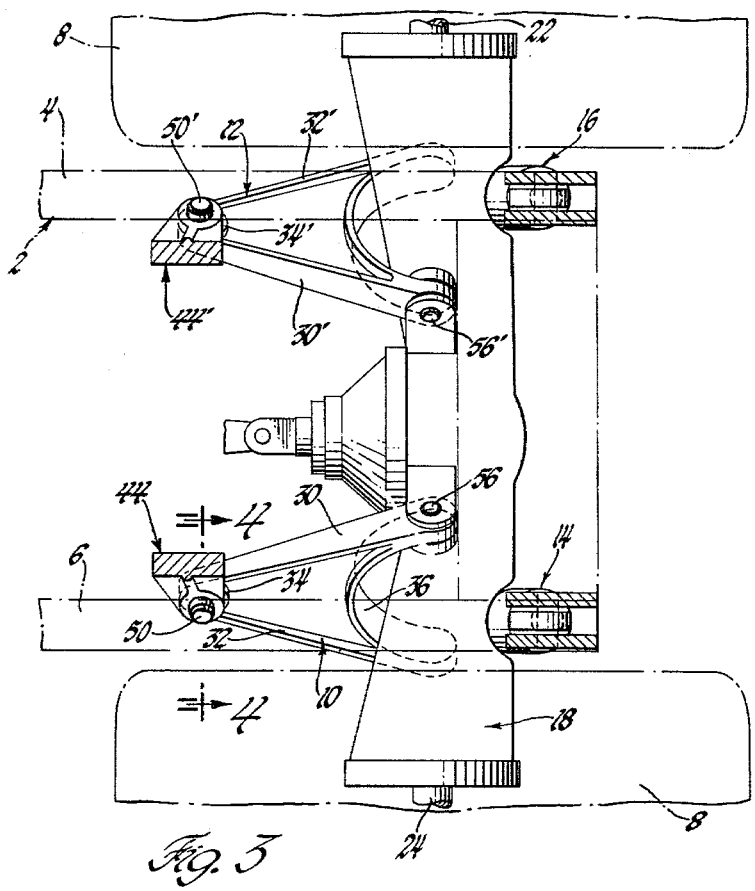
FIGURE 3 is a view taken on line 3—3 of FIGURE 1.

Referring to FIGS. 1, 2 and 3 of the drawings, the rear end portion of an off-highway vehicle is shown comprising a chassis 2 having transversely spaced beam members 4 and 6 suitably interconnected and extending longitudinally of the vehicle. The chassis is supported at its rear by ground-engaging wheels 8 which are drivingly connected to the vehicle through a suspension arrangement that includes control arms 10 and 12, spring devices 14 and 16, and a rear axle housing 18. The axle housing 18 rotatably supports stub axles 22 and 24 the outer ends of which carry the vehicle wheels while the inner ends connect with a conventional differential unit that transmits drive from the vehicle engine to the wheels.

At this point, it should be mentioned that, although the complete vehicle is not shown in FIGURE 1, it will be understood that this suspension system can be utilized with articulated vehicles of the type having relatively movable frame sections for steering purposes or with the conventional off-highway vehicle having a unitary frame. Also, it will be understood that, although the suspension system made in accordance with the invention is employed with the rear axle of a vehicle, it can also be utilized with the front axle in which case the parts would assume the same position as they do in FIGURE 1 except that the frame portion shown would constitute the front rather than the rear end of the vehicle. Moreover, it will be noted that both control arms 10 and 12 are identical in size and configuration. For this reason, a detail description of control arm 10 only shall be given, and portions of control arm 12 corresponding to those of control arm 10 will be identified by the same numerals but primed.

Figure 5:
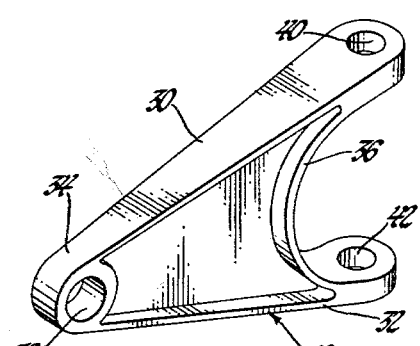
FIGURE 5 is an isometric view of one of the control arms used in the suspension system of FIGURE 1.

As seen in FIGURE 5, control arm 10 takes the form of an A frame with legs 30 and 32 thereof joined at a vertex portion 34 while the opposite ends of the respective legs are interconnected by an arcuate cross member 36. The vertex portion is provided with a transverse bore 38 while the free ends of the legs 30 and 32 are respectively formed with aligned bores 40 and 42 which have a common center axis that is perpendicular to the axis of the bore 38.

Figure 4:
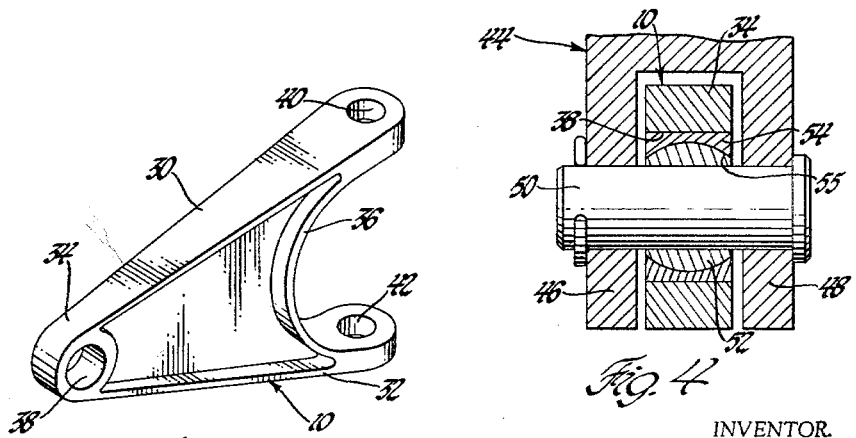
FIGURE 4 is an enlarged view taken on line 4—4 of FIGURE 3.

When combined with the vehicle chassis, the control arms are located on opposite sides of the longitudinal center of the vehicle for connection with the chassis and axle housing. As seen in FIGURES 3 and 4 the vertex portion 34 of the control arm 10 is pivotally connected to the vehicle through a support bracket 44 welded to the underside of the beam member 6. The support bracket is formed with a pair of depending ears 46 and 48 between which a pin 50 is fixed with the axis thereof inclined to the horizontal. The pin 50 supports an apertured ball 52 which in turn serves to pivotally support the vertex portion of the control arm 10. In this connection and as seen in FIGURE 4, the bore 38 fixedly accommodates an adaptor 54 having a spherical seating surface 55 that cooperates with the spherical outer surface of the ball 52 for providing limited universal pivotal movement of the control arm's vertex portion. The legs 30 and 32 extend rearwardly and are pivotally connected to the housing 18 by trunnions 56 and 58 which are received by the bores 40 and 42 of the control arm. As best seen in FIGURE 2, the respective trunnions are fixed to the housing above and below the axis of wheel rotation and at laterally spaced points so that the control arms lie in an inclined plane that extends longitudinally of the vehicle and forms an angle α with a vertical longitudinal plane y, y' that passes through the center of the vehicle. The vertex portion 34' of the control arm 12 is similarly connected between the chassis and rear axle through trunnions 56', 58' and support bracket 44'. The latter connections are identical to the corresponding connections associated with control arm 10. Moreover, the control arm 12 is located in an inclined plane that forms the same angle α with plane y, y' and intersects the plane of control arm 10 at a point A which can be considered the roll center of the vehicle about the axle. In this instance, the angle α is approximately 39 degrees; however, this angle can be varied by changing the inclination of the control arms with the result that the roll center lowered or raised. Furthermore, although not specifically shown, it should be noted that the opposite ends of each spring device 14, 16 are connected to the associated beam and axle housing through spherical joints of the type shown in FIGURE 4.

Thus, it should be apparent from the above description that this suspension system provides complete stability of the axle. For example, as viewed in FIGURE 1, both tractive and braking effort is resisted by each control arm inasmuch as the legs thereof are connected to the axle at points located above and below the axis of wheel rotation. Moreover, by placing the same pivot connections in an inclined plane, as shown in FIG. 2, lateral stability is obtained while at the same time permitting oscillation of the axle about a longitudinal axis located substantially at the roll center A. Vertical stability is provided by the spring devices 14 and 16 which, in addition, permit oscillation of the axle about a transverse axis passing through the spherical connections at the vertex portion of each control arm, and about the longitudinal axis referred to above. In the preferred form, a variable rate spring device, such as a hydro-pneumatic cylinder, is utilized with this system and causes change in the roll center location relative to the suspended vehicle frame whenever roll is experienced. In this regard, it should be noted that the roll center moves downward with respect to the chassis as the degree of roll is increased. In instances where constant rate springs are employed the roll center would not change in the above manner.

Various changes and modifications can be made in this construction without departing from the spirit of the invention. Such changes and modifications are contemplated by the inventor and he does not wish to be limited except by the scope of the appended claims.

What is claimed is:

1. A suspension system for a vehicle having a frame, comprising an axle assembly rotatably supporting ground-engaging wheels at the opposite ends thereof, first and second A-shaped control arms connecting said axle to said frame for oscillatory movement relative to the latter, each of said arms having the vertex portion thereof universally pivotally connected to said frame and the spaced arms thereof pivotally connected to the axle assembly at spaced pivot points located above and below the axis of wheel rotation, said spaced pivot points defining a common pivot axis that is inclined to the vertical and lies in a plane transverse to the axis of the wheel of rotation, and spring means connected between said axle and said frame for cushioning said oscillatory movement of the axle.

2. A suspension system for a vehicle chassis, comprising a transverse axle assembly rotatably supporting ground-engaging wheels at the opposite ends thereof, first and second A-shaped control arms connecting said axle to said chassis and extending longitudinally thereof, each of said control arms having the vertex portion thereof universally pivotally connected to said chassis and the spaced arms thereof pivotally connected to the axle assembly at spaced pivot points located above and below the axis of wheel rotation, said spaced pivot points defining a common pivot axis that is inclined to the vertical and lies in a plane transverse to the axis of the wheel of rotation, and spring means connected between said axle and said frame for cushioning oscillatory movement of the axle.

3. A suspension system for a vehicle having a frame, comprising an axle housing extending transversely of said frame, means in said housing for rotatably supporting ground-engaging wheels at the opposite ends thereof, first and second control arms respectively located on each side of the longitudinal axis of the vehicle, three spaced connecting portions formed on each of said arms, means pivotally supporting two of said connecting portions of each arm on said housing about a common pivot axis that is inclined to the vertical and lies in a plane transverse to the axis of wheel rotation, said means being located at spaced points above and below the axis of wheel rotation, means universally pivotally supporting the third connecting portion of each arm on said frame at a point longitudinally spaced from the first-mentioned means, and spring means connected between said axle and said frame for cushioning swinging movement of the axle.

4. A suspension system for a vehicle having a frame, comprising an axle housing extending transversely of said frame, means in said housing for rotatably supporting ground-engaging wheels at the opposite ends thereof, first and second control arms respectively located on each side of the longitudinal axis of the vehicle, three spaced connecting portions formed on each of said arms, means pivotally supporting two of said connecting portions of each arm on said housing about a common pivot axis that is inclined to the vertical and lies in a plane transverse to the axis of wheel rotation, means universally pivotally supporting the third connecting portion of each arm on said frame at a point longitudially spaced from the first mentioned means, and spring means connected between said axle and said frame for cushioning swinging movement of the axle.

5. A suspension system for a vehicle having a frame, comprising an axle housing extending transversely of said frame, means in said housing for rotatably supporting ground-engaging wheels at the opposite ends thereof, first and second control arms respectively located on each side of the longitudinal axis of the vehicle, three spaced connecting portions formed on each of said arms, means pivotally supporting two of said connecting portions of each arm on said hosuing about a common pivot axis that is inclined to the vertical and lies in a plane transverse to the axis of wheel rotation, said means being located at spaced points above and below the axis of wheel rotation, means universally pivotally supporting the third connecting portion of each arm on said frame at a point longitudinally spaced from the first-mentioned means and about a common axis extending transversely of the frame, and spring means connected adjacent each control arm and between said axle and said frame for cushioning swinging movement of the axle.

6. A suspension system for a vehicle having a frame, an axle housing extending transversely of the vehicle and having wheels rotatably supported at the opposite ends thereof, an A-shaped control arm located adjacent each end of said axle housing, means pivotally connecting said control arm between said axle housing and said frame, said means lying in a plane that extends longitudinally of the vehicle and intersects a vertical plane passing through the longitudinal axis of said vehicle above the axis of wheel rotation, and spring means connected between the axle housing and the frame for cushioning relative movement therebetween.

7. The suspension system of claim 6 wherein said spring means comprises a hydro-pneumatic cylinder having the opposite ends thereof connected by spherical joints to said axle housing and said frame.

References Cited in the file of this patent

FOREIGN PATENTS 610,518     Great Britain _____ Oct. 18, 1948